UNITED STATES PATENT OFFICE.

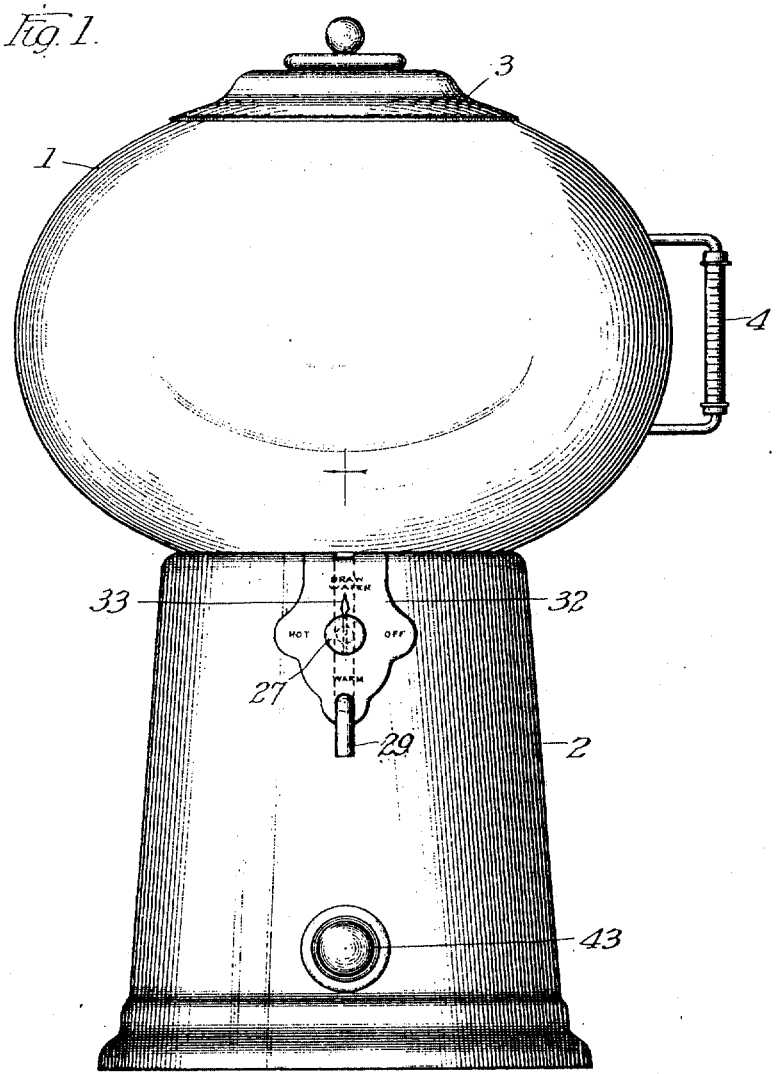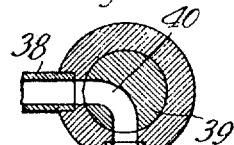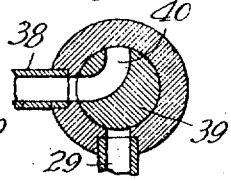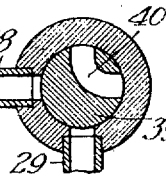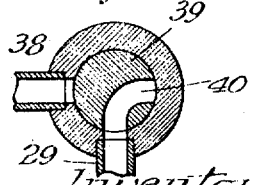

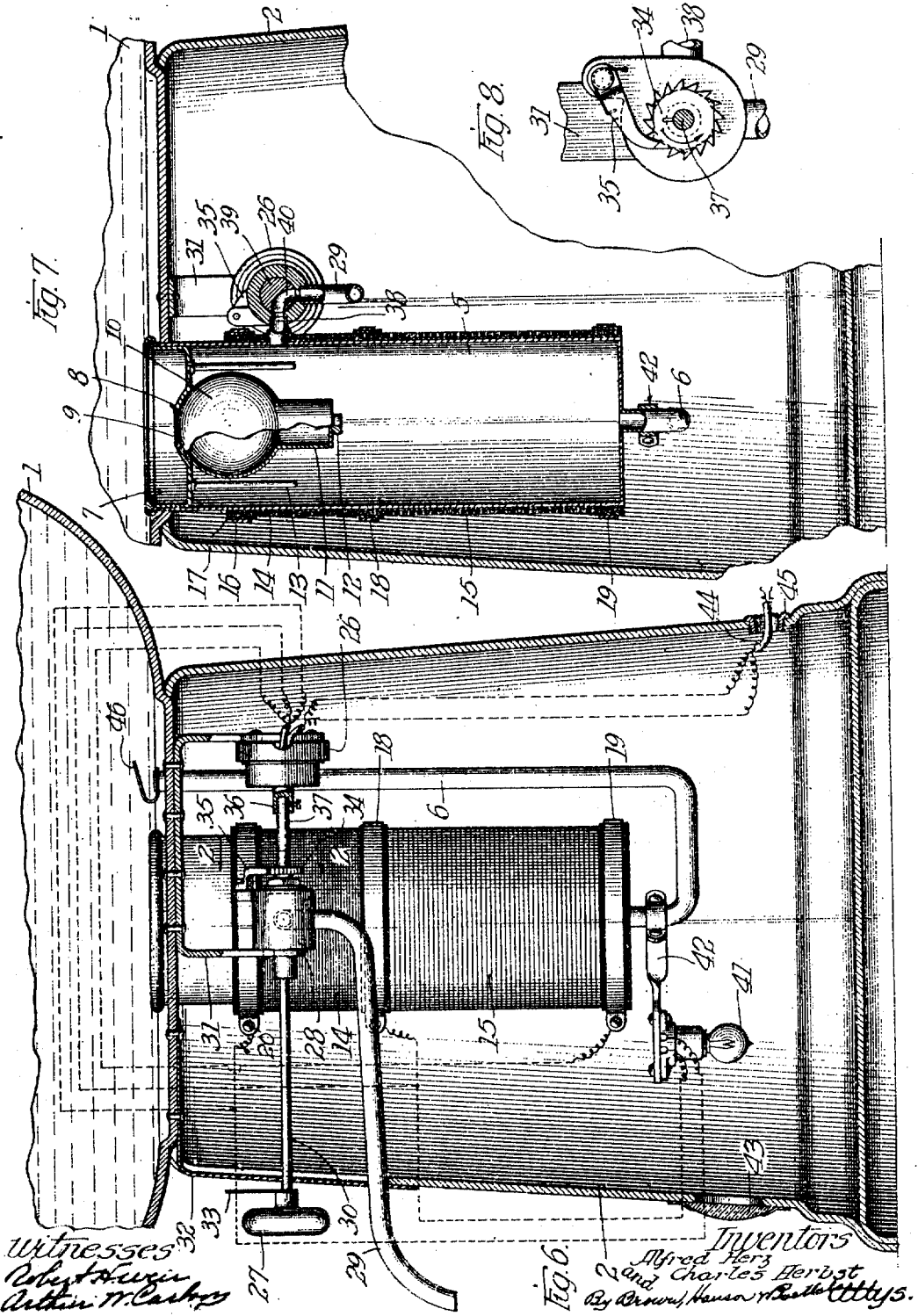

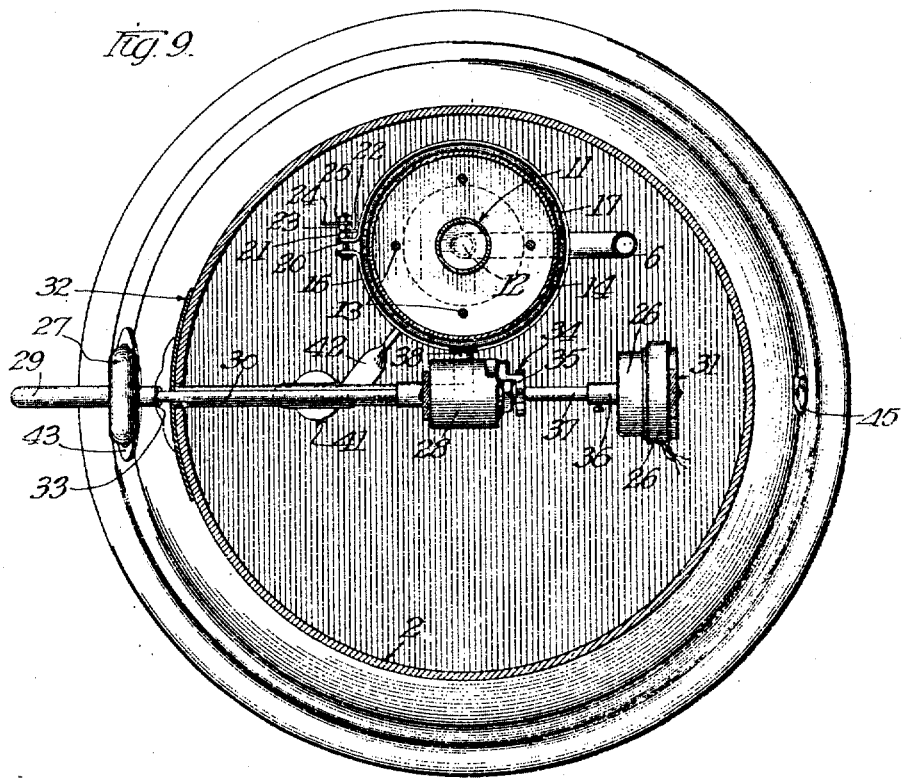

ALFRED HERZ AND CHARLES HERBST, OF CHICAGO, ILLINOIS; SAID HERBST ASSIGNOR TO SAID HERZ.

ELECTRIC WATER-HEATER.

1,235,203.  Specification of Letters Patent.  Patented July 31, 1917.

Application filed August 21, 1915. Serial No. 46,592.

*To all whom it may concern:*

Be it known that we, ALFRED HERZ and CHARLES HERBST, citizens of the United States, residing at Chicago, in the county of Cook and State of Illinois, have invented certain new and useful Improvements in Electric Water-Heaters, of which the following is a full, clear, and concise description, reference being had to the accompanying drawings, forming a part of this specification.

This invention relates to electric waterheaters. Heretofore in the art numerous arrangements have been devised to provide for the heating of small quantities of water in a vessel connected with a reservoir containing a relatively large quantity of water. Many of these devices have proven inefficient, due to the fact that upon opening the spigot to draw hot water the connection between the main reservoir and the heating vessel will not be closed off and cold water will be drawn. Another fault in some of these devices is that, even if a valve is employed to shut off the connection against return flow, the valve must be sensitive to allow of proper circulation, and, as a consequence, after circulation once starts, it persists to such an extent that the heating vessel does not retain the highly-heated liquid as it should, with the result that the heater is inefficient, due to the fact that it does not concentrate the heat upon the definite quantity of water that should be heated.

According to our invention, continuous circulation as such, is positively prevented, but an intermittent admission of cold fluid from the reservoir is caused whenever the fluid in the heating vessel has reached a given temperature. In this manner, the heating vessel always retains and maintains at the spigot a supply of hot water, even if it is only a part of the contents of the heating vessel, and does not dissipate its heat in trying to heat up the entire contents of the heating vessel and the reservoir. As the fluid is admitted from the reservoir, it forces out part of the liquid that is being heated, so that the hot water is "backed up" through the supply tube as fast as it is heated. This is, theoretically and practically, the most advantageous arrangement that can be devised, and we have found that a heater constructed in accordance with our invention is not only highly efficient, but operates almost instantly to bring some of the water to a high temperature without dissipating the heat in a large body of relatively cold water.

The primary object of our invention is to provide an improved water-heater. A further object is to provide an improved method of operation of water-heaters in general. Another object is to provide an electric heater of improved construction for waterheaters, as well as for all other classes of heating. Other and further objects will appear from the following description.

In the accompanying drawings, which form a part of the present specification,

Figure 1 is a front elevational view of the complete water-heater;

Figs. 2, 3, 4 and 5 are cross-sectional views showing the various positions of the valve;

Fig. 6 is a vertical section showing the arrangement of the valve, the switch and the heater;

Fig. 7 is a similar view taken at right angles to Fig. 6;

Fig. 8 is an enlarged detail view of the ratchet and pawl for preventing backward rotation of the switch-shaft;

Fig. 9 is a horizontal cross-section; and

Fig. 10 is a diagrammatic sketch illustrating the operation of the heater.

As above explained, the heater which we have illustrated in the accompanying drawings is particularly designed to heat a small quantity of water so as to be suitable for use at soda fountains, and the like. The main reservoir 1 is supported upon a base 2, which incloses the heating mechanism, shown more clearly in Figs. 6, 7 and 9.

The reservoir 1 is provided with a cover or top 3 and a gage-glass 4, which is connected at its upper and lower ends to the interior of the reservoir, for indicating the level of the water in the reservoir. A tubular heating vessel 5 is connected to the bottom of the reservoir 1 (see Figs. 6 and 7) and the bottom of this heating vessel is connected by means of a tube 6 with the reservoir. In this manner the heating vessel and the storage or circulation tube 6 form a loop, both ends of which are connected to the reservoir. The top of the heating vessel 5 is provided with a detachable valve-seat 7, which is preferably spun out of sheet metal and which is of such a diameter as to readily slip into the open end of the heating vessel 5 and be secured therein by frictional engagement. The central part of this valve-member is provided with a spherical seat 8, which surrounds an opening 9. A spherical ball-valve 10 coöperates with the seat 8 to close off the upper end of the heating vessel. The ball-valve 10 comprises an upper spherical portion and a lower cylindrical portion 11, to which is secured an adjusting weight 12. The valve is made hollow so as to be of a specific gravity less than unity, whereby the ball would float in the water. When the reservoir 1 and the heating vessel are filled with water, the tendency of the valve 10 is to float, and, as a consequence, it is held against the seat 8 to close off circulation. The valve 10 may be guided by suitable rods 13, although the same are not necessary. A pair of electric heaters 14 and 15 are arranged to heat the heating vessel 5 to bring the liquid to the desired temperature. The heater 14 comprises a winding of a number of turns of fine wire, and the heater 15 comprises windings of coarser wire, so that the wattage consumed by the heater 14 is considerably less than that consumed by the heater 15. The windings 14 and 15 are wound upon the heating vessel 5 with a layer of insulation interposed to prevent short-circuiting of the turns. The upper end of the winding 14 is embraced by a clamp 16, which mechanically secures the end of the winding and forms an electrical terminal therefor. A layer of insulation 17 is interposed between the winding 14 and the split band 16. In a similar manner the band 18 secures the lower end of the winding 14 and the upper end of the winding 15 and forms a common terminal for these windings. The band 19 forms the terminal for the lower end of winding 15.

This arrangement of a clamping band which embraces the end of the winding and forms an electrical terminal therefor, is very advantageous, inasmuch as no space is wasted in forming an electrical terminal. This is an especially advantageous feature where the electrical heater must be confined within a small space. It is also very advantageous since the surface from which heat may escape is reduced and heating is concentrated upon the object which it is desired to heat. The structure of the upper terminal-clamp 16 is shown in Fig. 9. The clamp comprises a band of metal having its ends bent outwardly and perforated to receive a bolt 20, which may be drawn tight by means of the nut 21. The lead 22 from the winding is gripped between the nut 21 and a similar nut 23, while the external lead 24 may be secured by an additional nut 25.

The heaters 14 and 15 are controlled by the switch 26, which is operated by means of the knob or handle 27, which knob is also employed to operate the valve 28 to control the drawing of liquid from the heating vessel 5 through the spigot 29. The shaft 30 to which the knob 27 is secured forms a common operating shaft for the valve 28 and the switch 26. The valve and switch are supported by means of a bracket 31 from the reservoir 1, so that the valve and heating mechanism may be withdrawn from the base 2 to give access to all of the parts. A suitable plate or escutcheon 32 is secured to the bottom of the reservoir 1 and forms suitable supporting means for the outer end of the shaft 30 and for the spigot 29. The switch 26 and the valve 28 have four positions, which are indicated by suitable legends on the escutcheon 32 (see Fig. 1). The knob 27 is provided with an indicator or pointer 33 for indicating the position of the valve and the switch. The shaft 30 can be rotated only in one direction, backward rotation being prevented by the ratchet-wheel 34, which is secured upon the shaft 30, and the pawl 35, which is pivoted on the casing of the valve 28. The switch 26 is a snap-switch, which is secured by a suitable coupling 36 to the extension 37 of the valve-stem 30. The casing of the valve 28 is connected by a short tube 38 with the heating vessel 5. The spigot 29 connects with the valve-casing at right-angles to the connection 38, and the body or plug 39 of the valve is provided with a quartered or right-angle port 40. In Figs. 2, 3, 4 and 5 we have illustrated the positions which the valve may occupy. In Fig. 2 the port 40 connects the heating vessel 5 with the spigot 29, so that hot liquid may be withdrawn from the heating vessel 5. The switch 26 at this time connects both the heaters 14 and 15 in circuit in parallel relation. In the next position, shown in Fig. 3, the valve is closed and the switch 26 disconnects both of the heaters, so that they are inactive. In the next position, shown in Fig. 4, the valve is still closed, but the switch 26 connects the low-wattage heater 14 in circuit. In the next position, shown in Fig. 5, the valve is still closed but both heaters 14 and 15 are connected in parallel to secure a maximum heating effect. The electrical connections for the positions shown in Figs. 2 and 5 are identical. A pilot lamp 41, which is mounted upon a suitable bracket 42, secured to the tube 6, is permanently connected across the terminals 16 and 18 of the low-wattage heater 14. A bull's eye or fresnel 43 is placed over an opening in the base 2 to indicate the condition of the pilot light 41. The lead wires 44, which may be connected to a suitable terminal, enter the base 2 through a suitable insulation 45.

The operation of the device is as follows: When the electrical heaters 14 and 15 are active, the water in the vessel 5 will be heated and a local circulation will be started, causing the hottest water to rise to the top of the vessel 5, where it will be prevented from rising further by means of the valve-member 7. The draw-off connection 38 is adjacent the top, so that any hot water that is generated will be available at once. The valve 10 is retained in its seat 8 by its own buoyancy and it closes off circulation which would otherwise occur. As the heating continues, steam will be formed and the steam will be trapped between the valve-member 7 and the liquid in the heating vessel 5. As a consequence, the floating valve 10, which we designate the circulation-control valve, loses the support which it has gained from the water heretofore and drops down away from its seat 8, exposing the opening 9, through which cold water from the reservoir above then descends, to condense the steam which has formed and to take the place of the water which was forced backward through the tube 6 when the steam was first formed. As the heating action continues, steam will again be formed, part of the water will be forced out of the vessel 5 back into the storage tube 6, the valve 10 will drop and another small quantity of water will be admitted through the valve opening 9. By this intermittent action hot water which is formed in the heating vessel 5 is slowly backed up, that is, it is moved in the opposite direction from which natural circulation would tend to move it, and it is moved away from the point from which it will be withdrawn, that is, it is forced downward away from the connection 38, through which liquid is drawn to the spigot 29. In this connection it is to be noted that the return tube 6 should be made of a diameter small enough to prevent any marked local circulation. When the valve 28 is opened to withdraw the hot liquid, flow of the water against the bottom of the cylindrical portion 11 of the ball-valve tends to hold it on its seat. The liquid which is drawn through the tube 6 is the hottest liquid in the system, and, besides, it is drawn through the entire length of the heating vessel, so that a nearly-uniform charge may be withdrawn within the capacity of the heater.

We consider this method of heating and storing liquid to be broadly new and to be applicable not only in the class of heaters illustrated in the present drawings, but to be capable of extensive use in a great variety of apparatus. In Fig. 10 we have illustrated diagrammatically the operation of the system. The floating ball-valve 10 has been replaced by a different type of thermally-controlled element, shown in this case as a metal thermostat, which controls a valve for closing off the supply tube. The valve has connected thereto a flow-controlled element, which corresponds to the bottom of the part 11 of the floating circulation-control valve shown in Fig. 7. The heating means is indicated diagrammatically, and the storage tube 70 is represented as comprising an extensive length of tubing or conduit. As soon as the liquid in the heating vessel 5 reaches a predetermined temperature, cold liquid is admitted by opening of the thermally-controlled valve, whereby a small charge of relatively cold liquid is introduced. The thermally-controlled valve then closes and the heating means expands the liquid in the heating vessel 5, driving some of it backward to the storage tube. As soon as the proper temperature of the liquid has been attained, the valve again opens, admitting further cold liquid. This action continues indefinitely, the liquid being trapped, expanded, a new charge admitted, trapped and again expanded in a regular cycle. When the draw-off connection 29 is opened the flow-controlled elements tend to shut off the valve connection so that only hot liquid will pass through the draw-off tube.

It is to be noted that the floating circulation-controlled valve 10 is controlled by the thermal condition of the water in which it is contained. Its function is to admit a fresh charge of cold liquid when the liquid at the top of the heating vessel 5 has reached a predetermined temperature.

While we have shown one particular form in which our invention may appear, we are aware that the same may be embodied in a great variety of forms, differing widely from the particular embodiment that we have illustrated and described. We consider the invention to be broadly new and desire that the appended claims be construed with all due liberality.

What we claim as new and desire to protect by Letters Patent of the United States is the following:

1. In combination, a supply-tank, a heating vessel connected thereto, below said tank, a valve between said tank and said vessel, a tube connected between the bottom of said vessel and said tank, said valve allowing liquid to move through it in a downward direction only, and means to heat said vessel.

2. In combination, a tank, a heating vessel connected to said tank, a tube connected to the bottom of said vessel and adapted to receive heated water from said vessel, a thermally-controlled valve for admitting relatively cold water to said vessel, and heating means for said vessel.

3. In combination, a tank, a heating vessel connected to said tank, a tube connected to the bottom of said heating vessel, and adapted to receive heated water from said vessel, a thermally-controlled valve for admitting water from said tank to said vessel, heating means for heating said vessel, and a spigot connected to said vessel adjacent said heating means and adapted to draw water from said vessel and from said tube.

4. In combination, a tank, a vertical heating vessel connected to the bottom of said tank, a tube connected between the bottom of said heating vessel and said tank, said tube adapted to receive hot water from said vessel, a floating valve between said tank and said vessel, and heating means for said vessel.

5. In combination, a tank, a vertical heating vessel connected to the bottom of said tank, a tube connected between the bottom of said heating vessel and said tank, said tube adapted to receive hot water from said vessel and to discharge into said tank, a floating valve between said tank and said vessel, heating means for said vessel, and a spigot or discharge connection communicating with said heating vessel.

6. In combination, a source of water-supply, a heating vessel, a connection between said source and said vessel, a floating valve governed by the water in said vessel for controlling said connection, a tube adapted to receive water discharged from said vessel, and heating means for said vessel.

7. In combination, a source of water-supply, a heating vessel, a connection therebetween, a thermally-controlled valve governing the connection between said source and said vessel, said valve being controlled by the temperature at the top of said vessel, a tube connected to the bottom of said vessel adapted to receive water discharged from said vessel, heating means for heating said vessel, and a spigot or draw-off connection communicating with said vessel adjacent said heating means.

8. In combination, a tank, a tubular heating vessel connected thereto and extending downwardly therefrom, a tube connected between said tank and the bottom of said vessel, a valve-seat in said vessel adjacent the top thereof, a thermally-controlled valve below said valve-seat, said valve opening downwardly, and heating means for said vessel.

9. In combination, a tank, a tubular heating vessel connected thereto and extending downwardly therefrom, a tube connected between said tank and the bottom of said vessel, a valve-seat in said vessel adjacent the top thereof, heating means for said vessel, and a floating ball-valve in said vessel, said valve coöperating with said valve-seat to control the connection between said tank and the top of said heating vessel.

10. The method of heating and storing a fluid which consists in partially confining the fluid in a relatively small heating vessel or space, then applying heat to the fluid in said small space and causing the same to expand, then driving the heated fluid out of said space into a storage space, and substantially simultaneously therewith admitting a small quantity of relatively cold fluid to said heating space to take the place of the fluid so expelled.

11. The method of heating and storing a fluid which consists in partially confining a small quantity of the fluid in a heating space, then heating said small quantity, then causing expansion of the heated fluid to expel the coldest part of the fluid so confined into a storage space, whereby the hot fluid is backed out of said confined space, and then admitting a small quantity of relatively cold fluid to take the place of the hot fluid which was backed up by said expansion and expulsion.

12. The method of heating and storing a liquid which consists in partially confining a relatively small quantity of liquid, then heating said quantity to cause a portion thereof to vaporize and expel a part of the liquid from the bottom of said small quantity into a reservoir-space or storage-space, then admitting a small quantity of relatively cold liquid to condense said vapor and to take the place of the liquid expelled, then withdrawing the liquid from said reservoir or storage-space through said heated space.

13. The method of heating and storing a liquid which consists in partially confining a relatively small quantity of liquid, then heating said quantity to cause a portion thereof to vaporize and to expel a part of the liquid thus confined into a reservoir or storage-space, then admitting a small quantity of relatively cold liquid to condense said vapor and to take the place of the liquid so expelled, then drawing the liquid from said reservoir or storage-space through said heating space and simultaneously closing off the supply of relatively cold liquid.

14. The method of heating and storing a liquid which consists in partially confining a relatively small quantity of the liquid in a heating space, then heating said quantity to cause a portion thereof to vaporize and to expel a part of the liquid from said space into a reservoir or storage-space, then admitting a quantity of relatively cold liquid to condense said vapor and to take the place of the liquid so expelled, then drawing the liquid from said reservoir or storage-space through said heated space, and simultaneously causing the drawing of liquid to prevent admission of relatively cold liquid.

15. The method of heating and storing hot water, or the like, which consists in partially confining a small body of water in a heating vessel, then heating the water in the heating vessel to the point of forming steam and expelling a part of the water into a storage reservoir, then causing said steam to admit cold water to partially condense the steam and to take the place of the water expelled.

16. The method of heating and storing hot water, or the like, which consists in partially confining a small body of water in a heating vessel, then heating the water in said vessel to the point of forming steam and expelling a part of the liquid into a storage reservoir, then causing said steam to admit cold water to partially condense the steam and to take the place of the water so expelled, then withdrawing the hot water from said storage reservoir through said heating vessel.

17. In combination, a source of liquid supply, a heating vessel, a discharge or storage-tube connected to said heating vessel, thermally-controlled valve means controlling the connection between said source and said vessel, and a tap or draw connection communicating with said heating vessel, said valve means having means controlled by withdrawal of liquid from said discharge or storage tube for shutting off connection between the heating vessel and the source of supply.

18. In combination a source of water supply, a heating vessel, a connection between said source and the top of said vessel, a valve controlled by the temperature of the water at the top of said vessel, said valve controlling the connection to admit relatively cold water to said vessel, and a hot water storage tube connected to the bottom of said vessel.

19. In combination a source of water supply, a heating vessel, a connection between said source and the top of said vessel, a valve controlled by the temperature of the water at the top of said vessel, said valve controlling the connection to admit relatively cold water from said source of supply, a hot water storage tube connected to the bottom of said vessel and a draw-off connection connected adjacent the top of said vessel.

20. In combination a tank, a heating vessel connected thereto, a valve-seat between said tank and said vessel and a floating valve below said valve-seat.

21. In combination a reservoir, a heating vessel extending downwardly from said reservoir, a check valve closing the connection between said reservoir and the top of said heating vessel, said check valve facing downwardly and heating means for said heating vessel.

22. In combination a reservoir, a tubular heating vessel extending downwardly from said reservoir, a floating check valve closing the connection between said reservoir and the top of said heating vessel, said check valve opening downwardly only and heating means for said heating vessel.

23. The method of heating and storing water which consists in confining the water in a passage, then heating one portion of said passage to bring the liquid therein slightly above the desired temperature, then injecting relatively cold water to reduce the temperature and then substantially simultaneously therewith expelling a part of the liquid from said passage.

24. The method of heating and storing water which consists in confining the water in a vertical passageway, then heating the top portion of said passageway to bring the water at that point to the point of forming steam, then forcing out a portion of the liquid from the bottom of said passageway and then injecting relatively cold water to condense the steam.

In witness whereof we hereunto subscribe our names this thirteenth day of August, A. D. 1915.

ALFRED HERZ.
CHARLES HERBST.

Copies of this patent may be obtained for five cents each, by addressing the "Commissioner of Patents, Washington, D. C."